US008842733B2

(12) United States Patent
Orchard et al.

(10) Patent No.: US 8,842,733 B2
(45) Date of Patent: *Sep. 23, 2014

(54) METHOD AND APPARATUS FOR MULTIPLE DESCRIPTION VIDEO CODING

(75) Inventors: Michael Orchard, Princeton, NJ (US); Hamid Jafarkhani, Middletown, NJ (US); Amy Reibman, Matawan, NJ (US); Yao Wang, Matawan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,612

(22) Filed: Jun. 11, 2012

(65) Prior Publication Data

US 2012/0300847 A1 Nov. 29, 2012

Related U.S. Application Data

(60) Continuation of application No. 12/872,152, filed on Aug. 31, 2010, now Pat. No. 8,199,822, which is a continuation of application No. 11/050,570, filed on Feb. 3, 2005, now Pat. No. 7,813,427, which is a continuation of application No. 10/350,537, filed on Jan. 23, 2003, now Pat. No. 6,920,177, which is a division of application No. 09/478,002, filed on Jan. 5, 2000, now Pat. No. 6,556,624.

(60) Provisional application No. 60/145,852, filed on Jul. 27, 1999.

(51) Int. Cl.
| | |
|---|---|
| H04N 7/12 | (2006.01) |
| H04N 11/02 | (2006.01) |
| H04N 11/04 | (2006.01) |
| H04N 19/30 | (2014.01) |
| H04N 19/107 | (2014.01) |
| H04N 19/146 | (2014.01) |
| H04N 19/114 | (2014.01) |
| H04N 19/176 | (2014.01) |
| H04N 19/61 | (2014.01) |
| H04N 19/177 | (2014.01) |
| H04N 21/2343 | (2011.01) |
| H04N 19/39 | (2014.01) |

(52) U.S. Cl.
CPC . *H04N 21/234327* (2013.01); *H04N 19/00424* (2013.01); *H04N 19/0003* (2013.01); *H04N 19/00169* (2013.01); *H04N 19/00054* (2013.01); *H04N 19/00278* (2013.01); *H04N 19/00781* (2013.01); *H04N 19/00284* (2013.01); *H04N 19/0046* (2013.01)
USPC .................................................. 375/240.12

(58) Field of Classification Search
CPC . H04N 1/00169; H04N 19/0003; H04N 7/50; H04N 7/262449
USPC ....................................... 375/240.01–240.25
See application file for complete search history.

(56) References Cited

U.S. PATENT DOCUMENTS

| | | |
|---|---|---|
| 5,731,835 A | 3/1998 | Kuchibholta |
| 5,841,476 A | 11/1998 | Takishima et al. |

(Continued)

FOREIGN PATENT DOCUMENTS

EP 1202463 A1 5/2002

OTHER PUBLICATIONS

Vaishampayan, V.A., Design of Multiple Description Scalar Quantizers, IEEE Transactions on Information Theory, May 1993, vol. 39, Issue 3, IEEE, Piscataway, NJ, p. 821-834.

(Continued)

*Primary Examiner* — Nhon Diep
(74) *Attorney, Agent, or Firm* — Toler Law Group, PC

(57) ABSTRACT

A method and apparatus for utilizing temporal prediction and motion compensated prediction to accomplish multiple description video coding is disclosed. An encoder receives a sequence of video frames and divides each frame into non-overlapping macroblocks. Each macroblock is then encoded using either an intraframe mode (I-mode) or a prediction mode (P-mode) technique. Both the I-mode and the P-mode encoding techniques produce an output for each of n channels used to transmit the encoded video data.

15 Claims, 10 Drawing Sheets

(56) References Cited

U.S. PATENT DOCUMENTS

| | | |
|---|---|---|
| 5,956,088 A | 9/1999 | Shen et al. |
| 5,990,955 A | 11/1999 | Koz |
| 6,028,896 A | 2/2000 | Jang et al. |
| 6,084,912 A | 7/2000 | Reitmeier et al. |
| 6,122,314 A | 9/2000 | Bruls et al. |
| 6,151,360 A | 11/2000 | Kato et al. |
| 6,181,742 B1 | 1/2001 | Rajagopalan et al. |
| 6,181,743 B1 | 1/2001 | Bailleul |
| 6,185,254 B1 | 2/2001 | Ogata |
| 6,192,154 B1 | 2/2001 | Rajagopalan et al. |
| 6,330,370 B2 | 12/2001 | Goyal et al. |
| 6,345,125 B2 | 2/2002 | Goyal et al. |
| 6,460,153 B1 | 10/2002 | Chou et al. |
| 6,556,624 B1 | 4/2003 | Orchard et al. |
| 6,611,530 B1 | 8/2003 | Apostolopoulos |
| 6,920,177 B2 | 7/2005 | Orchard et al. |
| 7,813,427 B2 | 10/2010 | Orchard et al. |
| 8,199,822 B2 | 6/2012 | Orchard et al. |

OTHER PUBLICATIONS

Wang, Y. et al., Multiple Description Image Coding for Noisy Channels by Pairing Transform Coefficients, IEEE First Workshop on Multimedia Signal Processing, 1997, IEEE, Piscataway, NJ, p. 419-424.

METHOD AND APPARATUS FOR MULTIPLE DESCRIPTION VIDEO CODING

CLAIM OF PRIORITY

The present application is a continuation of U.S. patent application Ser. No. 12/872,152, filed Aug. 31, 2010, which is a continuation of U.S. patent application Ser. No. 11/050,570, filed Feb. 3, 2005 (now U.S. Pat. No. 7,813,427), which is a continuation of U.S. patent application Ser. No. 10/350,537, filed Jan. 23, 2003 (now U.S. Pat. No. 6,920,177), which is a divisional application of U.S. application Ser. No. 09/478, 002, filed Jan. 5, 2000 (now U.S. Pat. No. 6,556,624), which claims the benefit of and priority from U.S. Provisional Application Ser. No. 60/145,852 entitled "Method and Apparatus for Accomplishing Multiple Description Coding for Video," filed Jul. 27, 1999.

FIELD OF THE DISCLOSURE

The present disclosure relates to video coding. More particularly, the present disclosure relates to a method for utilizing temporal prediction and motion compensated prediction to perform multiple description video coding.

BACKGROUND

Most of today's video coder standards use block-based motion compensated prediction because of its success in achieving a good balance between coding efficiency and implementation complexity.

Multiple Description Coding ("MDC") is a source coding method that increases the reliability of a communication system by decomposing a source into multiple bitstreams and then transmitting the bitstreams over separate, independent channels. An MDC system is designed so that, if all channels are received, a very good reconstruction can be made. However, if some channels are not received, a reasonably good reconstruction can still be obtained. In commonly assigned U.S. patent application Ser. No. 08/179,416, a generic method for MDC using a pairwise correlating transform referred to as ("MDTC") is described. This generic method is designed by assuming the inputs are a set of Gaussian random variables. A method for applying this method for image coding is also described. A subsequent and similarly commonly assigned U.S. Provisional Application Ser. No. 60/145,937, describes a generalized MDTC method.

Unfortunately, in existing video coding systems when not all of the bitstream data sent over the separate channels is received, the quality of the reconstructed video sequence suffers. Likewise, as the amount of the bitstream data that is not received increases the quality of the reconstructed video sequence that can be obtained from the received bitstream decreases rapidly.

Accordingly, there is a need in the art for a new approach for coding a video sequence into two descriptions using temporal prediction and motion compensated prediction to improve the quality of the reconstructions that can be achieved when only one of the two descriptions is received.

DETAILED DESCRIPTION

Embodiments of the present invention provide a block-based motion-compensated predictive coding framework for realizing MDC, which includes two working modes: Intraframe Mode (I-mode) and Prediction Mode (P-mode). Coding in the P-mode involves the coding of the prediction errors and estimation/coding of motion. In addition, for both the I-mode and P-mode, the MDTC scheme has been adapted to code a block of Discrete Cosine Transform ("DCT") coefficients.

Embodiments of the present invention provide a system and method for encoding a sequence of video frames. The system and method receive the sequence of video frames and then divide each video frame into a plurality of macroblocks. Each macroblock is then encoded using at least one of the I-mode technique and the P-mode technique, where, for n channels the prediction mode technique generates at least n+1 prediction error signals for each block. The system and method then provide the I-mode technique encoded data and the at least n+1 P-mode technique prediction error signals divided between each of the n channels being used to transmit the encoded video frame data.

The Overall Coding Framework

In accordance with an embodiment of the present invention, a multiple description ("MD") video coder is developed using the conventional block-based motion compensated prediction. In this embodiment, each video frame is divided into non-overlapping macroblocks which are then coded in either the I-mode or the P-mode. In the I-mode, the color values of each of the macroblocks are directly transformed using a Discrete Cosine Transform ("DCT") and the resultant quantized DCT coefficients are then entropy coded. In the P-mode, a motion vector which describes the displacement between the spatial position of the current macroblock and the best matching macroblock, is first found and coded. Then the prediction error is coded using the DCT. Additional side information describing the coding mode and relevant coding parameters is also coded.

Figure 1:
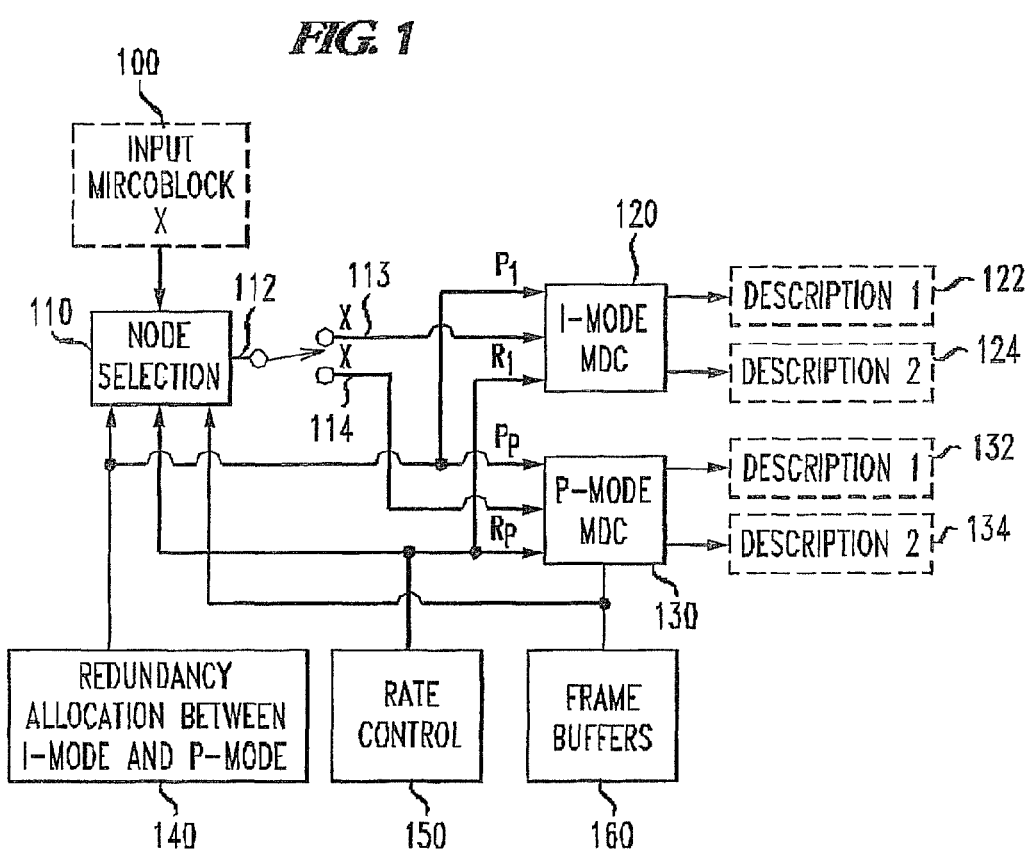
FIG. 1 provides a block diagram of the overall framework for Multiple Description Coding ("MDC") of video using motion compensated prediction.
Figure 8:
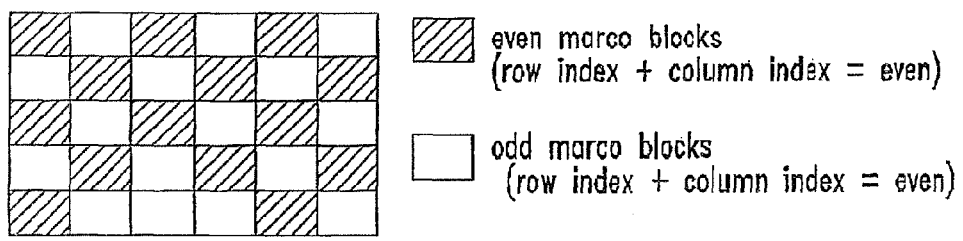
FIG. 8 is a block diagram of an embodiment of an odd-even block encoding of a macroblock in the present invention.

An embodiment of an overall MDC framework of the present invention is shown in FIG. 1 and is similar to the conventional video coding scheme using block-based motion compensated predictive coding. In FIG. 1, an input analog video signal is received in an analog-to-digital ("A/D") converter (not shown) and each frame from the input analog video signal is digitized and divided into non-overlapping blocks of approximately uniform size as illustrated in FIG. 8. Although shown as such in FIG. 8, the use of non-overlapping macroblocks of approximately uniform size is not required by the present invention and alternative embodiments of the present invention are contemplated in which non-overlapping macroblocks of approximately uniform size are not used. For example, in one contemplated alternative embodiment, each digitized video frame is divided into overlapping macroblocks having non-uniform sizes. Returning to FIG. 1, each input macroblock X 100 is input to a mode selector 110 and then the mode selector selectively routes the input macroblock X 100 for coding in one of the two modes using switch 112 by selecting either channel 113 or channel 114. Connecting switch 112 to channel 113 enables I-mode coding in an I-mode MDC 120, and connecting switch 112 with channel 114 enables P-mode coding in a P-mode MDC 130. In the I-mode MDC 120, the color values of the macroblock are coded directly into two descriptions, description 1 122 and description 2 124, using either the MDTC method; the generalized MDTC method described in co-pending U.S. patent application Ser. No. 08/179,416; Vaishampayan's Multiple Description Scalar Quantizer ("MDSQ"); or any other multiple description coding technique. In the P-mode MDC 130, the macroblock is first predicted from previously coded frames and two (2) descriptions are produced, description 1 132 and description 2 134. Although shown as being output on separate channels, embodiments of the present invention are contemplated in which the I-mode description 1 122 and the P-mode description 1 132 are output to a single channel. Similarly, embodiments are contemplated in which the I-mode description 2 124 and the P-mode description 2 134 are output to a single channel.

In FIG. 1, the mode selector 110 is connected to a redundancy allocation unit 140 and the redundancy allocation unit 140 communicates signals to the mode selector 110 to control the switching of switch 112 between channel 113 for the I-mode MDC 120 and channel 114 for the P-mode MDC 130. The redundancy allocation unit 140 is also connected to the I-mode MDC 120 and the P-mode MDC 130 to provide inputs to control the redundancy allocation between motion and prediction error. A rate control unit 150 is connected to the redundancy allocation unit 140, the mode selector 110, the I-mode MDC 120 and the P-mode MDC 130. A set of frame buffers 160 is also connected to the mode selector 110 for storing previously reconstructed frames from the P-mode MDC 130 and for providing macroblocks from the previously reconstructed frames back to the P-mode MDC 130 for use in encoding and decoding the subsequent macroblocks.

In an embodiment of the present invention, a block-based uni-directional motion estimation method is used, in which, the prediction macroblock is determined from a previously decoded frame. Two types of information are coded: i) the error between the prediction macroblock and the actual macroblock, and ii) the motion vector, which describes the displacement between the spatial position of the current macroblock and the best matching macroblock. Both are coded into two descriptions. Because the decoder may have either both descriptions or one of the two descriptions, the encoder has to take this fact into account in coding the prediction error.

The proposed framework for realizing MDC in the P-mode is described in more detail below.

Note that the use of I-mode coding enables the system to recover from an accumulated error due to the mismatch between the reference frames used in the encoder for prediction and that available at the decoder. The extra number of bits used for coding in the I-mode, compared to using the P-mode, is a form of redundancy that is intentionally introduced by the coder to improve the reconstruction quality when only a single description is available at the decoder. In conventional block-based video coders, such as an H.263 coder, described in ITU-T, "Recommendation H.263 Video Coding for Low Bitrate Communication," July 1995, the choice between I-mode and P-mode is dependent on which mode uses fewer bits to produce the same image reconstruction quality. For error-resilience purposes, I-mode macroblocks are also inserted periodically, but very sparsely, for example, in accordance with an embodiment of the present invention, one I-mode macroblock is inserted after approximately ten to fifteen P-mode macroblocks. The rate at which the I-mode macroblocks are inserted is highly dependent on the video being encoded and, therefore, the rate at which the I-mode macroblocks are inserted is variably controlled by the redundancy allocation unit 140 for each video input stream. In applications requiring a constant output rate, the rate control component 150 regulates the total number of bits that can be used on a frame-by-frame basis. As a result, the rate control component 150 influences the choice between the I-mode and the P-mode. In an embodiment of the present invention, the proposed switching between I-mode and P-mode depends not only on the target bit rate and coding efficiency but also on the desired redundancy. As a result of this redundancy dependence, the redundancy allocation unit 140, which, together with the rate control unit 150, determines, i) on the global level, redundancy allocation between I-mode and P-mode; and ii) for every macroblock, which mode to use.

P-mode Coding.

Figure 2:
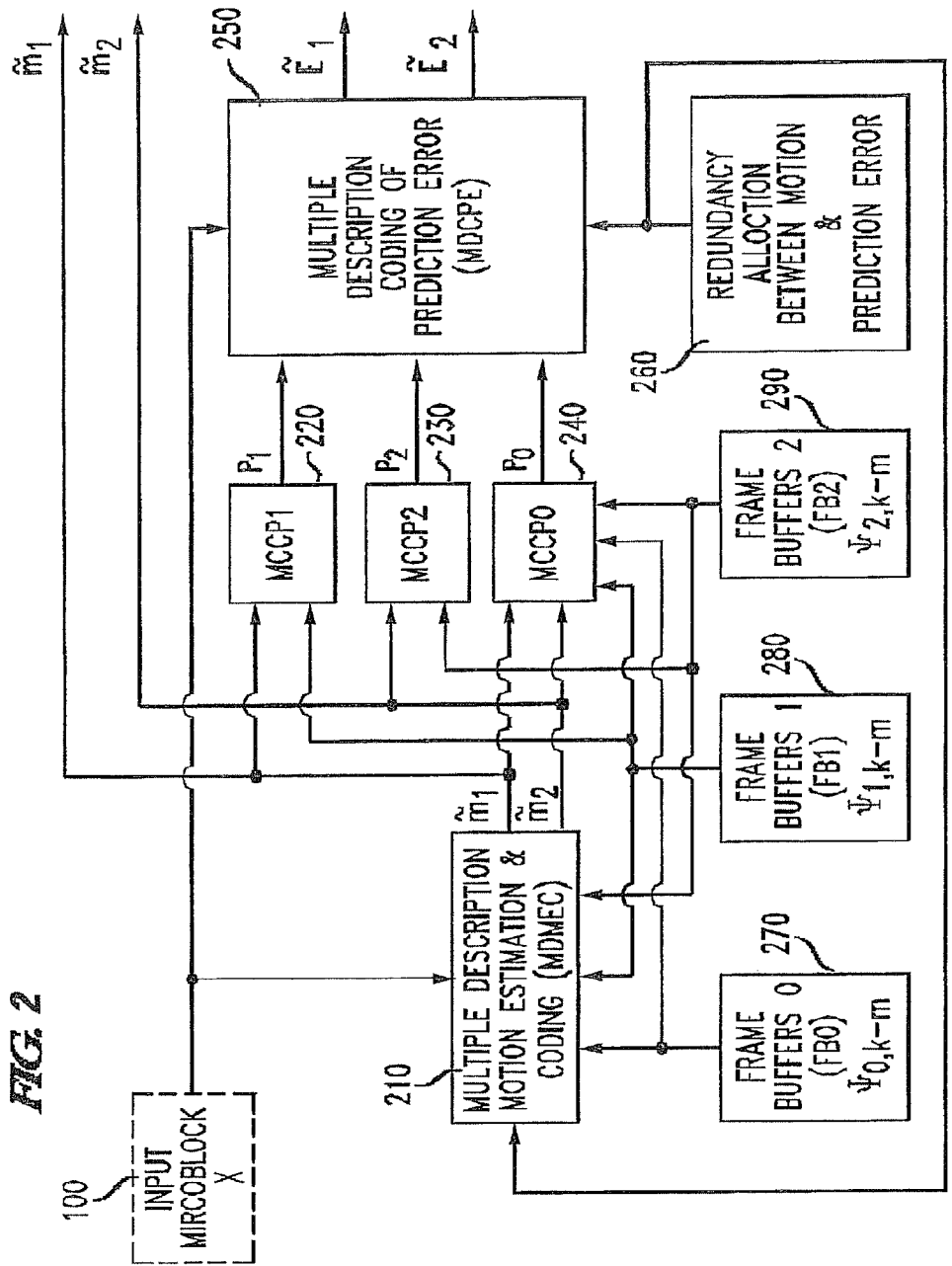
FIG. 2. provides a block diagram of the framework for MDC in P-mode.

In general, the MDC coder in the P-mode will generate two descriptions of the motion information and two descriptions of the prediction error. A general framework for implementing MDC in the P-mode is shown in FIG. 2. In FIG. 2, the encoder has three separate frame buffers ("FB"), FB0 270, FB1 280 and FB2 290, for storing previously reconstructed frames from both descriptions ($\psi_{o,k-m}$), description one ($\psi_{1,k-m}$), and description two ($\psi_{2,k-m}$), respectively. Here, k represents the current frame time, k–m, m=1, 2, . . . , k, the previous frames up to frame 0. In this embodiment, prediction from more than one of the previously coded frames is permitted. In FIG. 2, a Multiple Description Motion Estimation and Coding ("MDMEC") unit 210 receives as an initial input macroblock X 100 to be coded at frame k. The MDMEC 210 is connected to the three frame buffers FB0 270, FB1 280 and FB2 290 and the MDMEC 210 receives macroblocks from the previously reconstructed frames stored in each frame buffer. In addition, the MDMEC 210 is connected to a redundancy allocation unit 260 which provides an input motion and prediction error redundancy allocation to the MDMEC 210 to use to generate and output two coded descriptions of the motion information, $\tilde{m}_1$ and $\tilde{m}_2$. The MDMEC 210 is also connected to a first Motion Compensated Predictor 0 ("MCP0") 240, a second Motion Compensated Predictor 1 ("MCP1") 220 and a third Motion Compensated Predictor 2 ("MCP2") 230. The two coded descriptions of the motion information, $\tilde{m}_1$ and $\tilde{m}_2$ are transmitted to the MCP0 240, which generates and outputs a predicted macroblock $P_0$ based on $\tilde{m}_1$, $\tilde{m}_2$ and macroblocks from the previously reconstructed frames from the descriptions where i=0, 1, 2, which are provided by frame buffers FB0 270, FB1 280 and FB2 290. Similarly, MCP1 220 generates and outputs a predicted macroblock $P_1$ based on $\hat{m}_1$ from the MDMEC 210 and a macroblock from the previously reconstructed frame from description one ($\psi_{1,k-m}$) from FB1 280. Likewise, MCP2 230 generates and outputs a predicted macroblock $P_2$ based on $\hat{m}_2$ from the MDMEC 210 and a macroblock from the previously reconstructed frame from description two ($\psi_{2,k-m}$) from FB2 290. In this general framework, MCP0 240 can make use of $\psi_{1,1,k-m}$ and $\psi_{2,k-m}$ in addition to $\psi_{o,k-m}$. MCP0 240, MCP1 220 and MCP2 230 are each connected to a multiple description coding of prediction error ("MDCPE") unit 250 and provide predicted macroblocks $P_0$, $P_1$ and $P_2$, respectively, to the MDCPE 250. The MDCPE 250 is also connected to the redundancy allocation unit 260 and receives as input the motion and prediction error redundancy allocation. In addition, the MDCPE 250 also receives the original input macroblock X 100. The MDCPE 250 generates two coded descriptions of prediction error, $\hat{E}_1$ and $\hat{E}_2$, based on input macroblock X 100, $P_0$ $P_1$, $P_2$ and the motion and prediction error redundancy allocation. Description one 132, in FIG. 1, of the coded video consists of $\hat{m}_1$ and $\hat{E}_1$ for all the macroblocks. Likewise, description two 134, in FIG. 1, consists of $\hat{m}_2$ and $\hat{E}_2$ for all the macroblocks. Exemplary embodiments of the MDMEC 210 and MDCPE 250 are described in the following sections.

Multiple Description Coding of Prediction Error (MD-CPE)

Figure 3A:
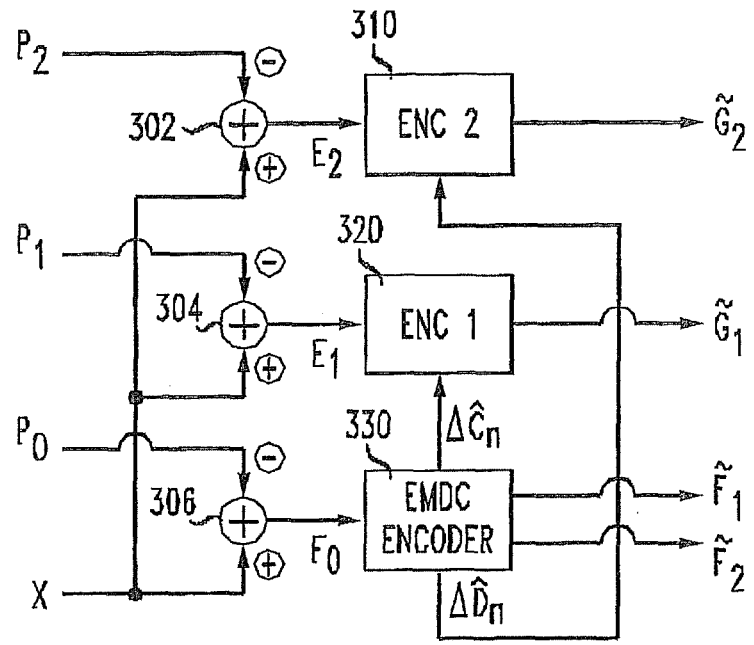
FIG. 3A. provides a block diagram of the general framework for the MDC Prediction Error ("MDCPE") encoder of FIG. 2.

The general framework of a MDCPE encoder implementation is shown in FIG. 3A. First, the prediction error in the case when both descriptions are available, $F=X-P_0$, is coded into two descriptions $\tilde{F}_1$ and $\tilde{F}_2$. In FIG. 3A, predicted macroblock $P_0$ is subtracted from input macroblock X 100 in an adder 306 and a both description side prediction error $F_0$ is input to an Error Multiple Description Coding ("EMDC") Encoder 330. The encoding is accomplished in the EMDC Encoder 330 using, for example, MDTC or MDC. To deal with the case when only the i-th description is received (that is where i=1 or 2) either an encoder unit one ("ENC1") 320 or an encoder unit two ("ENC2") 310 takes either pre-run length coded coefficients, $\Delta\tilde{C}_n$, $\Delta\tilde{D}_n$, respectively, and a description i side prediction error $E_i$, where $E_i=X-P_i$, and produces a description i enhancement stream $\tilde{G}_i$. $\tilde{G}_i$ together with $\tilde{F}_1$ form a description i. Embodiments of the encoders ENC1 320 and ENC2 310 are described in reference to FIGS. 3A, 4, 5, 6 and 7. As shown in FIG. 3A, $P_2$ is subtracted from input macroblock X 100 by an adder 302 and a description two side prediction error $E_2$ is output. $E_2$ and $\Delta\tilde{D}_n$ are then input to ENC2 310 and a description two enhancement stream $\tilde{G}_2$ is output. Similarly, $P_1$ is subtracted from input macroblock X 100 in an adder 304 and a description one side prediction error $E_1$ is output. $E_1$ and $\Delta\tilde{C}_n$ are then input to ENC1 320 and a description one enhancement stream $\tilde{G}_1$ 322 is output. In an alternate embodiment (not shown), $\Delta\tilde{C}_n$ and $\Delta\tilde{D}_n$ are determined from $\tilde{F}_1$ and $\tilde{F}_2$ by branching both of the $\tilde{F}_1$ and $\tilde{F}_2$ output channels to connect with ENC1 320 and ENC2 310, respectively. Before the branches connect to ENC1 320 and ENC2 310, they each pass through separate run length decoder units to produce $\Delta\tilde{C}_n$ and $\Delta\tilde{D}_n$, respectively. As will be seen in the description referring to FIG. 4, this alternate embodiment requires two additional run length decoders to decode $\tilde{F}_1$ and $\tilde{F}_2$ to obtain $\Delta\tilde{C}_n$ and $\Delta\tilde{D}_n$, which had just been encoded into $\tilde{F}_1$ and $\tilde{F}_2$ in EMDC encoder 320.

Figure 3B:
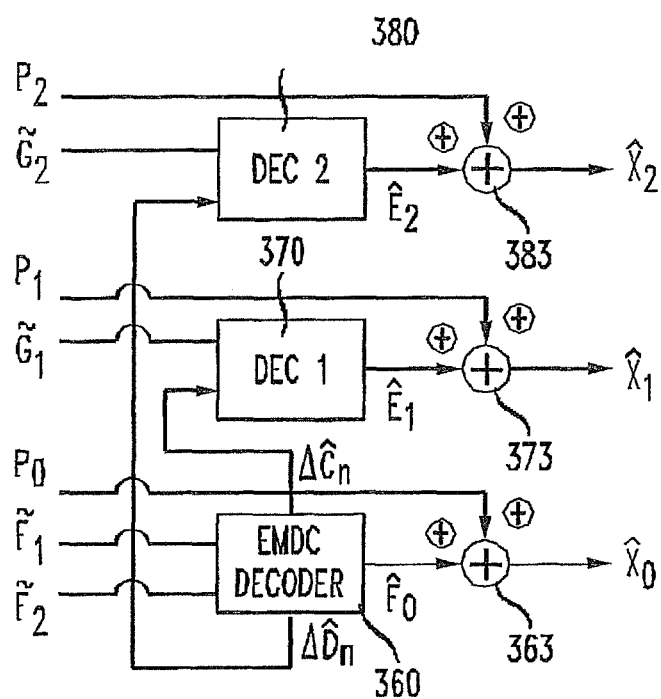
FIG. 3B provides a block diagram of the general framework for the MDCPE decoder of FIG. 2.

In the decoder, shown in FIG. 3B, if both descriptions, that is, $\tilde{F}_1$ and $\tilde{F}_2$, are available, an EMDC decoder unit 360 generates $\hat{F}_0$ from inputs $\tilde{F}_1$ and $\tilde{F}_2$, where $\hat{F}_0$ represents the reconstructed F from both $\tilde{F}_1$ and $\tilde{F}_2$. $\hat{F}_0$ is then added to $P_0$ in an adder 363 to generate a both description recovered macroblock $\hat{X}_0$. $\hat{X}_0$ is defined as $\hat{X}_0=P_0+\hat{F}_0$. When both descriptions are available, enhancement streams $\tilde{G}_1$ and $\tilde{G}_2$ are not used. When only description one is received, a first side decoder ("DEC1") 370, produces $\hat{E}_1$ from inputs $\Delta\tilde{C}_n$ and $\tilde{G}_1$ and then $\hat{E}_1$ is added to $P_1$ in an adder 373 to generate a description one recovered macroblock $\hat{X}_1$. The description one recovered macroblock is defined as $\hat{X}_1=P_1+\hat{E}_1$. When only description two is received, a second side decoder ("DEC2") 380, produces $\hat{E}_2$ from inputs $\Delta\tilde{D}_n$ and $\tilde{G}_2$ and then $\hat{E}_2$ is added to $P_2$ in an adder 383 to generate a description two recovered macroblock $\hat{X}_2$. The description two recovered macroblock, $\hat{X}_2$, is defined as $\hat{X}_2=P_2+\hat{E}_2$. Embodiments of the decoders DEC1 370 and DEC2 380 are described in reference to FIGS. 3B, 4, 5, 6 and 7. As with the encoder in FIG. 3A, in an alternate embodiment of the decoder (not shown), $\Delta\tilde{C}_n$ and $\Delta\tilde{D}_n$ are determined from $\tilde{F}_1$ and $\tilde{F}_2$ by branching both of the $\tilde{F}_1$ and $\tilde{F}_2$ output channels to connect with ENC1 320 and ENC2 310, respectively. Before the branches connect to ENC1 320 and ENC2 310, they each pass through separate run length decoder units (not shown) to produce $\Delta\tilde{C}_n$ and $\Delta\tilde{D}_n$, respectively. As with the alternate embodiment for the encoder described above, this decoder alternative embodiment requires additional run length decoder hardware to extract $\Delta\tilde{C}_n$ and $\Delta\tilde{D}_n$ from $\tilde{F}_1$ and $\tilde{F}_2$ just before $\Delta\tilde{C}_n$ and $\Delta\tilde{D}_n$ are extracted from $\tilde{F}_1$ and $\tilde{F}_2$ in EMDC decoder 360.

Note that in this framework, the bits used for $G_i$, i=1, 2 are purely redundancy bits, because they do not contribute to the reconstruction quality when both descriptions are received. This portion of the total redundancy, denoted by $\rho_{e,2}$ can be controlled directly by varying the quantization accuracy when generating $G_i$. The other portion of the total redundancy, denoted by $\rho_{e,1}$, is introduced when coding F using the MDTC coder. Using the MDTC coder enables this redundancy to be controlled easily by varying the transform parameters. The redundancy allocation unit 260 manages the redundancy allocation between $\rho_{e,2}$ and $\rho_{e,1}$ for a given total redundancy in coding the prediction errors.

Based on this framework, alternate embodiments have been developed, which differ in the operations of ENC1 320/DEC1 370 and ENC2 310/DEC2 380. While the same type of EMDC encoder 330 and EMDC decoder 380 described in FIGS. 3A and 3B are used, the way in which $\tilde{G}_i$ is generated by ENC1 320 and ENC2 310 is different in each of the alternate embodiments. These alternate embodiments are described below in reference to FIGS. 4, 5 and 6.

Implementation of the EMDC ENC1 and ENC2 Encoders

Figure 4:
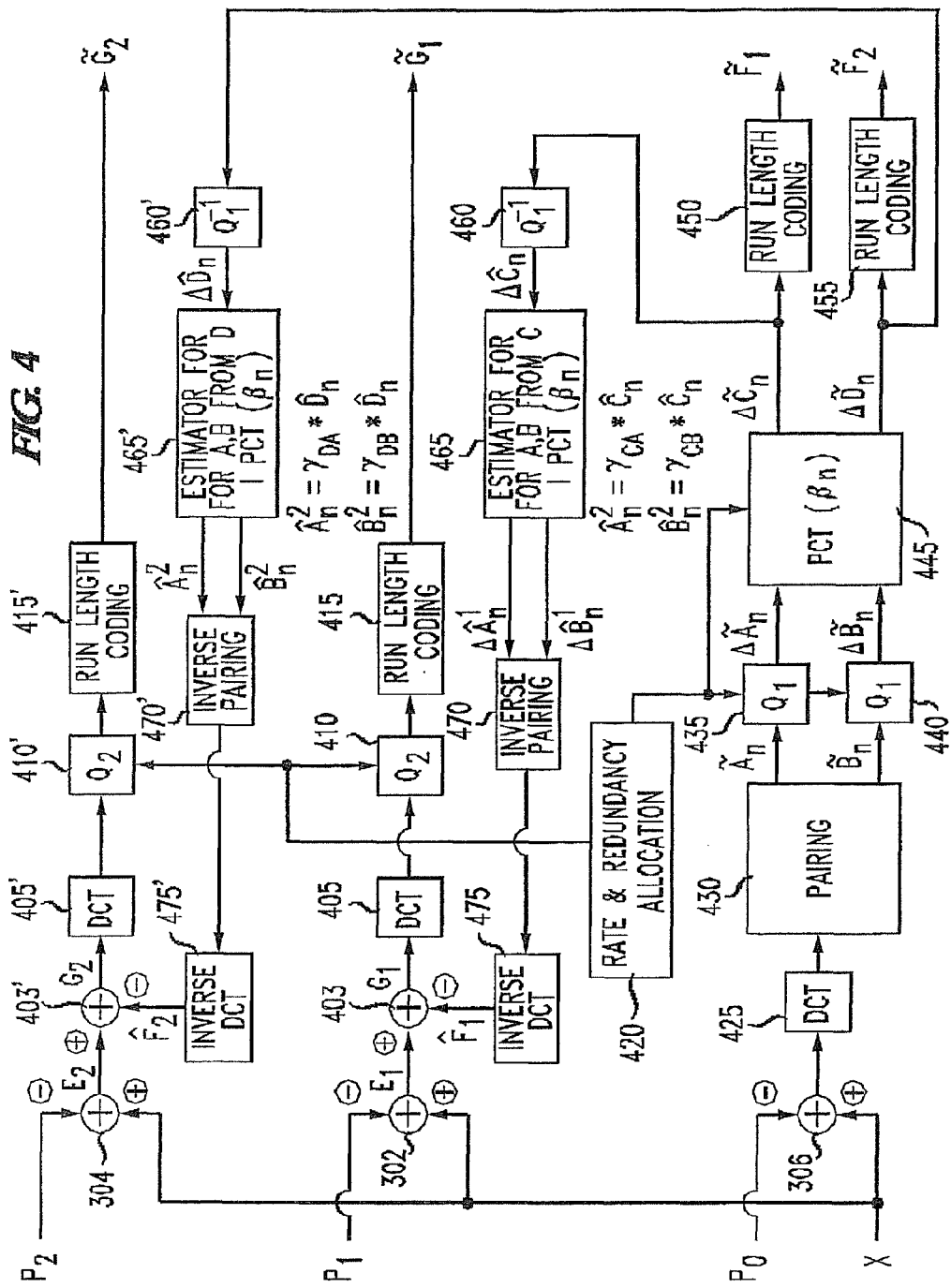
FIG. 4 provides a block diagram of an embodiment of the MDCPE encoder of FIG. 3A.

FIG. 4 provides a block diagram of an embodiment of multiple description coding of prediction error in the present invention. In FIG. 4, an MDTC coder is used to implement the EMDC encoder 330 in FIG. 3A. In FIG. 4, for each 8×8 block of central prediction error $P_0$ is subtracted from the corresponding 8×8 block from input macroblock X 100 in an adder 306 to produce $E_0$ and then $E_0$ is input to the DCT unit 425 which performs DCT and outputs N≤64 DCT coefficients. A pairing unit 430 receives the N≤64 DCT coefficients from the DCT unit 425 and organizes the DCT coefficients into N/2 pairs ($\tilde{A}_n$, $\tilde{B}_n$) using a fixed pairing scheme for all frames. The N/2 pairs are then input with an input, which controls the rate, from a rate and redundancy allocation unit 420 to a first quantizer one ("Q1") unit 435 and a second Q1 unit 440. The Q1 units 435 and 440, in combination, produce quantized pairs ($\Delta\tilde{A}_n$, $\Delta\tilde{B}_n$). It should be noted that both N and the pairing strategy are determined based on the statistics of the DCT coefficients and the k-th largest coefficient is paired with the (N−k)-th largest coefficient. Each quantized pair ($\Delta\tilde{A}_n$, $\Delta\tilde{B}_n$) is then input with a transform parameter $\beta_n$, which controls a first part of the redundancy, from the rate and redundancy allocation unit 420 to a Pairwise Correlating Transform ("PCT") unit 445 to produce the coefficients ($\Delta \tilde{C}_n$, $\Delta \tilde{D}_n$), which are then split into two sets. The unpaired coefficients are split even/odd and appended to the PCT coefficients. The coefficients in each set, $\Delta \tilde{C}_n$ and $\Delta \tilde{D}_n$, are then run length and Huffman coded in run length coding units 450 and 455, respectively, to produce $\tilde{F}_1$ and $\tilde{F}_2$. Thus, $\tilde{F}_1$ contains $\Delta \tilde{C}_n$ in coded run length representation, and $\tilde{F}_2$ contains $\Delta \tilde{D}_n$ in coded run length representation. In the following, three different embodiments for obtaining $\tilde{G}_i$ from FIG. 3A are described. For ease of description, in the descriptions related to the detailed operation of the ENC1 320 and ENC2 310 in FIGS. 4, 5 and 6, components in ENC2 310 which are analogous to components in ENC1 320 are denoted as primes. For example, in FIG. 4, ENC1 320 has a DCT component 405 for calculating $\tilde{G}_1$ and ENC2 310 has an analogous DCT component 405' for calculating $\tilde{G}_2$.

In accordance with an embodiment of the present invention, shown in FIG. 4, the central prediction error $\tilde{F}_1$ is reconstructed from $\Delta \tilde{C}_n$ and $\Delta \tilde{C}_n$ is also used to generate $\tilde{G}_1$. To generate $\tilde{G}_1$, $\Delta \tilde{C}_n$ from PCT unit 445 is input to an inverse quantizer ("$Q_1^{-1}$") 460 and dequantized C coefficients, $\Delta \tilde{C}_n$ are output. A linear estimator 465 receives the $\Delta \tilde{C}_n$ and outputs estimated DCT coefficients $\Delta \hat{A}_n^1$ and $\Delta \hat{B}_n^1$. $\Delta \hat{A}_n^1$ and $\Delta \hat{B}_n^1$ which are then input to inverse pairing unit 470 which converts the N/2 pairs into DCT coefficients and outputs the DCT coefficients to an inverse DCT unit 475 which outputs $\hat{F}_1$ to an adder 403. $P_1$ is subtracted from each corresponding 8×8 block from input macroblock X 100 in the adder 302 and the adder 302 outputs $E_1$ to the adder 403. $\hat{F}_1$ is subtracted from $E_1$ in the adder 403 and $G_1$ is output. In the absence of any additional information, the reconstruction from description one alone will be $P_1+\hat{F}_1$. To allow for a more accurate reconstruction, $G_1$ is defined as $G_1=X-P_1-\hat{F}_1$, and $G_1$ is coded into $\tilde{G}_1$ using conventional DCT coding. That is, $G_1$ is DCT transformed in a DCT coder 405 to produce DCT coefficients for $G_1$. The DCT coefficients are then input to a quantizer two ("$Q_2$") 410, quantized with an input, which controls a second part of redundancy, from the rate and redundancy unit 420 in $Q_2$ 410 and the quantized coefficients are output from $Q_2$ 410 to a run length coding unit 415. The quantized coefficients are then run length coded in run length coding unit 415 to produce the description one enhancement stream $\tilde{G}_1$.

Also shown in FIG. 4, the central prediction error $\tilde{F}_2$ is reconstructed from $\Delta \tilde{D}_n$ and $\Delta \tilde{D}_n$ is also used to generate $\tilde{G}_2$. To generate $\tilde{G}_2$, $\Delta \tilde{D}_n$ from PCT unit 445' is input to $Q_1^{-1}$ 460' and dequantized D coefficients, $\Delta \tilde{D}_n$ are output. A linear estimator 465' receives the $\Delta \tilde{D}_n$ and outputs estimated DCT coefficients $\Delta \hat{A}_n^2$ and $\Delta \hat{B}_n^2$. $\Delta \hat{A}_n^2$ and $\Delta \hat{B}_n^2$ are then input to inverse pairing unit 470' which converts the N/2 pairs into DCT coefficients and outputs the DCT coefficients to an inverse DCT unit 475' which outputs $\hat{F}_2$ to an adder 403'. $P_2$ is subtracted from each corresponding 8×8 block from input macroblock X 100 in the adder 304 and the adder 304 outputs $E_2$ to the adder 403'. $\hat{F}_2$ is subtracted from $E_2$ in the adder 403' and $G_2$ is output. In the absence of any additional information, the reconstruction from description two alone will be $P_2+\hat{F}_2$. To allow for a more accurate reconstruction, $G_2$ is defined as $G_2=X-P_2-\hat{F}_2$, and $G_2$ is coded into $\tilde{G}_2$ using conventional DCT coding. That is, $G_2$ is DCT transformed in a DCT coder 405' to produce DCT coefficients for $G_2$. The DCT coefficients are then input to $Q_2$ 410', quantized with an input from the rate and redundancy unit 420 in $Q_2$ 410' and the quantized coefficients are output from $Q_2$ 410' to a run length coding unit 415'. The quantized coefficients are then run length coded in run length coding unit 415' to produce the description two enhancement stream $\tilde{G}_2$.

In accordance with the current embodiment of the present invention, the EMDC decoder 360 in FIG. 3B is implemented as an inverse circuit of the EMDC encoder 330 described in FIG. 4. With the exception of the rate and redundancy unit 420, all of the other components described have analogous inverse components implemented in the decoder. For example, in the EMDC decoder, if only description one is received, the same operation as described above for the encoder is used to generate $\hat{F}_1$ from $\Delta \tilde{C}_n$. In addition, by inverse quantization and inverse DCT, the quantized version of $G_1$, denoted by $\hat{G}_1$, is recovered from $\tilde{G}_1$. The finally recovered block in this side decoder is $X_1$, which is defined as $X_1 = P_1 + \hat{F}_1 + \hat{G}_1$.

In the embodiment of FIG. 4, more than 64 coefficients are needed to be coded in the EMDC 330 and ENC1 320 together. While the use of the 64 coefficients completely codes the mismatch error, $G_1$, subject to quantization errors, it requires too many bits. Therefore, in accordance with another embodiment of the present invention, only 32 coefficients are coded when generating $\tilde{G}_1$, by only including the error for the D coefficients. Likewise, only 32 coefficients are coded when generating $\tilde{G}_2$, by only including C coefficients. Specifically, as shown in FIG. 5, DCT is applied to side prediction error $E_1$ in the DCT coder 405, where $E_1=X-P_1$, and the same pairing scheme as in the central coder is applied to generate N pairs of DCT coefficients in pairing unit 510.

Figure 5:
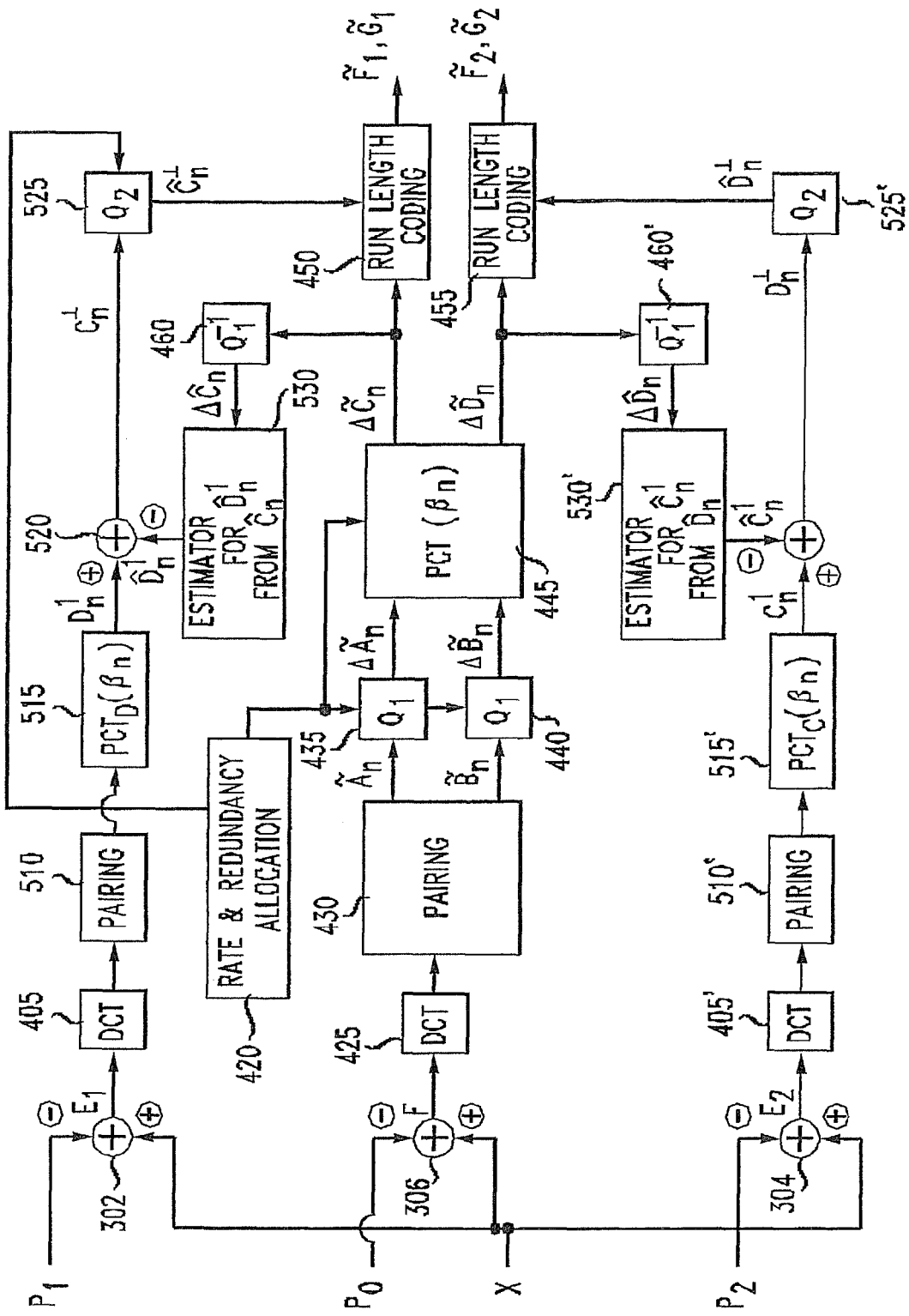
FIG. 5 provides a block diagram of another embodiment of the MDCPE encoder of FIG. 3A.

As in FIG. 4, in FIG. 5, to implement the EMDC encoder 330, a MDTC coder is used. For each 8×8 block of central prediction error, $P_0$ is subtracted from each corresponding 8×8 block from input macroblock X 100 in the adder 306 to produce $E_0$ and then $E_0$ is input to the DCT unit 425 which performs DCT on $E_0$ and outputs N≤64 DCT coefficients. In pairing unit 430, the coder takes the N≤64 DCT coefficients from the DCT unit 425 and organizes them into N/2 pairs ($\tilde{A}_n$, $\tilde{B}_n$) using a fixed pairing scheme for all frames. The N/2 pairs are then input with an input from the rate and redundancy allocation unit 420 to the Q1 quantizer units 435 and 440, respectively, and Q1 quantizer units 435 and 440 produce quantized pairs ($\Delta \tilde{A}_n$, $\Delta \tilde{B}_n$), respectively. It should be noted that both N and the pairing strategy are determined based on the statistics of the DCT coefficients and the k-th largest coefficient is paired with the (N−k)-th largest coefficient. Each quantized pair ($\Delta \tilde{A}_n$, $\Delta \tilde{B}_n$) is input with an input from the rate and redundancy allocation unit 420 to a PCT unit 445 with the transform parameter $\beta_n$ to produce the coefficients ($\Delta \tilde{C}_n$, $\Delta \tilde{D}_n$), which are then split into two sets. The unpaired coefficients are split even/odd and appended to the PCT coefficients.

In accordance with an embodiment of the present invention, shown in FIG. 5, an estimate of the central prediction error $\tilde{F}_1$ is reconstructed from $\Delta \tilde{C}_n$ and $\Delta \tilde{C}_n$ is also used to generate $\tilde{G}_1$. To generate $\tilde{G}_1$, $\tilde{C}_n$ from PCT unit 445 is input to $Q_1^{-1}$ 460 and dequantized C coefficients, $\Delta \tilde{C}_n$ are output to a linear estimator 530. The linear estimator 530 receives the $\Delta \tilde{C}_n$ and outputs an estimated DCT coefficient $\hat{D}_n^1$, which is input to an adder 520. $P_1$ is subtracted from each corresponding 8×8 block from input macroblock X 100 in the adder 302 to produce side prediction error $E_1$ which is then input to conventional DCT coder 405 where DCT is applied to $E_1$. The output of the DCT coder 405 is input to pairing unit 510 and the same pairing scheme as described above for pairing unit 430 is applied to generate N pairs of DCT coefficients. The N pairs of DCT coefficients are then input to a PCT unit 515 with transform parameter $\beta_n$ which generates only the D component, $D_n^1$. Then, $D_n^1$ is input to an adder 520 and $\hat{D}_n^1$ is subtracted from $D_n^1$ and an error $C_n^-$ is output. The error $C_n^-$, which is defined as $C_n^- = D_n^1 \cdot \hat{D}_n^1$, is input with an input from the rate and redundancy allocation unit 420 to Q2 525 and quantized to produce a quantized error, $\hat{C}_n^-$. The $\tilde{C}_n$ coefficients from the PCT unit 515 and the quantized error $\hat{C}_n^-$ are then together subjected to run-length coding in run length coding unit 450 to produce a resulting bitstream $\tilde{F}_1, \tilde{G}_1$, which constitutes $\tilde{F}_1$ and $\tilde{G}_1$ from FIG. 3A.

Likewise, an estimate of the central prediction error $\tilde{F}_1$ is reconstructed from $\Delta \tilde{D}_n$ and $\Delta \tilde{D}_n$ is also used to generate $\tilde{G}_2$. To generate $\tilde{G}_2$, $\tilde{D}_n$ from PCT unit 445' is input to $Q_1^{-1}$ 460' and dequantized D coefficients, $\Delta \hat{D}_n$ are output to a linear estimator 530'. The linear estimator 530' receives the $\Delta \hat{D}_n$ and outputs an estimated DCT coefficient $\hat{D}_n^1$, which is input to an adder 520'. $P_2$ is subtracted from each corresponding 8×8 block from input macroblock X 100 in the adder 304 to produce side prediction error $E_2$ which is then input to conventional DCT coder 405' where DCT is applied to $E_2$. The output of the DCT coder 405' is input to pairing unit 510' and the same pairing scheme as described above for pairing unit 430 is applied to generate N pairs of DCT coefficients. The N pairs of DCT coefficients are then input to a PCT unit 515' with transform parameter $\beta_n$ which generates only the C component, $C_n^1$. Then, $C_n^1$ is input to an adder 520' and $\hat{C}_n^1$ is subtracted from $C_n^1$ and an error $D_n^-$ is output. The error $D_n^-$, which is defined as $D_n^- = C_n^1 \cdot D_n^-$, is input with an input from the rate and redundancy allocation unit 420 to Q2 525' and quantized to produce a quantized error, $\hat{D}_n^-$. The $\tilde{D}_n$ coefficients from the PCT unit 515' and the quantized error $\hat{D}_n^-$ are then together subjected to run-length coding in run length coding unit 450' to produce a resulting bitstream $\tilde{F}_2, \tilde{G}_2$, which constitutes $\tilde{F}_2$ and $\tilde{G}_2$ from FIG. 3A.

In accordance with the current embodiment of the present invention, the DEC1 370 from FIG. 3B is implemented as an inverse circuit of the ENC1 320 described in FIG. 4. With the exception of the rate and redundancy unit 420, all of the other components described have analogous inverse components implemented in the decoder. For example, in the DEC1 370, if only description one is received, which includes, after run length decoding and dequantization, $C_n$ and $\hat{C}_n^-$, the PCT coefficients corresponding to the side prediction error can be estimated by $\hat{C}_n^1 = \hat{C}_n, \hat{D}_n^1 = \hat{D}_n^1(\hat{C}_n) + \hat{C}_n^-$. Then inverse PCT can be performed on $\hat{C}_n^1$ and $\hat{D}_n^1$, followed by inverse DCT to arrive at quantized prediction error $\hat{E}_1$. The finally recovered macroblock, $X_1$, is reconstructed by adding $P_1$ and $\hat{E}_1$ together, such that, $X_1 = P_1 + \hat{E}_1$.

Figure 6:
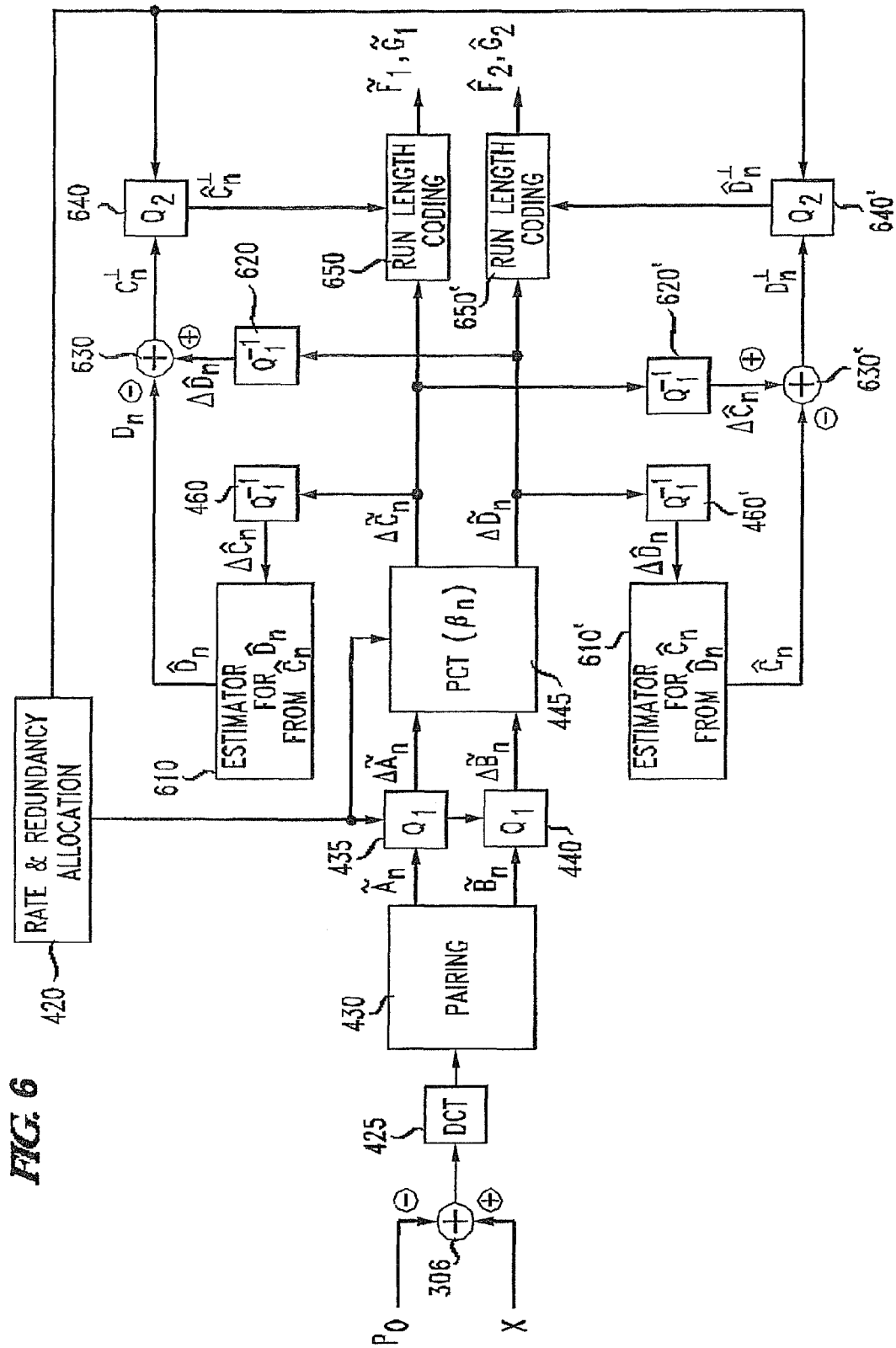
FIG. 6 provides a block diagram of another embodiment of the MDCPE encoder of FIG. 3A.

In another embodiment of the present invention, the strategy is to ignore the error in the side predictor and use some additional redundancy to improve the reconstruction accuracy for the $D_n$ in the central predictor. This is accomplished by quantizing and coding the estimation error for $C_n^- = \Delta \hat{D}_n - \hat{D}_n(\hat{C}_n)$, as shown in FIG. 6. This scheme is the same as the generalized PCT, where four variables are used to represent the initial pair of two coefficients As in the previously described embodiments, in FIG. 6, to implement the EMDC encoder 330, a MDTC coder is used. For each 8×8 block of central prediction error, $P_0$ is subtracted from each corresponding 8×8 block from input macroblock X 100 in the adder 306 to produce $E_0$ and then $E_0$ is input to the DCT unit 425 which performs DCT on $E_0$ and outputs N≤64 DCT coefficients. A pairing unit 430 receives the N≤64 DCT coefficients from the DCT unit 425 and organizes them into N/2 pairs ($\tilde{A}_n, \tilde{B}_n$) using a fixed pairing scheme for all frames. The N/2 pairs are then input with an input from the rate and redundancy allocation unit 420 to Q1 quantizer units 435 and 440, respectively, and Q1 quantizer units 435 and 440 produce quantized pairs ($\Delta \tilde{A}_n, \Delta \tilde{B}_n$), respectively. It should be noted that both N and the pairing strategy are determined based on the statistics of the DCT coefficients and the k-th largest coefficient is paired with the (N−k)-th largest coefficient. Each quantized pair ($\Delta \tilde{A}_n, \Delta \tilde{B}_n$) is input with an input from the rate and redundancy allocation unit 420 to the PCT unit 445 with the transform parameter $\beta_n$ to produce the PCT coefficients ($\Delta \tilde{C}_n, \Delta \tilde{D}_n$), which are then split into two sets. The unpaired coefficients are split even/odd and appended to the PCT coefficients.

In accordance with an embodiment of the present invention, shown in FIG. 6, $\tilde{C}_n$ is input to inverse quantizer $Q_1^{-1}$ 460 and dequantized C coefficients, $\Delta \hat{C}_n$ are output to a linear estimator 610. The linear estimator 610 is applied to $\Delta \hat{C}_n$ to produce an estimated DCT coefficient $\hat{D}_n$ which is output to an adder 630. Similarly, $\tilde{D}_n$ is input to a second inverse quantizer $Q_1^{-1}$ 620 and dequantized D coefficients, $\Delta \hat{D}_n$ are also output to the adder 630. Then, $\hat{D}_n$ is subtracted from $\Delta \hat{D}_n$ in the adder 630 and the error $C_n^-$ is output. The error $C_n^- = \Delta \hat{D}_n - \hat{D}_n(\hat{C}_n)$ is input with an input from the rate and redundancy allocation unit 420 to quantizer Q2 640 and quantized to produce $\hat{C}_n^1$. The $\tilde{C}_n$ coefficients and the quantized error $\hat{C}_n^-$ are then together subjected to run-length coding in run length coding unit 650 to produce the resulting bitstream $\tilde{F}_1, \tilde{G}_1$, which constitutes $\tilde{F}_1$ and $\tilde{G}_1$ from FIG. 3A.

Similarly, in FIG. 6, $\tilde{D}_n$ is input to inverse quantizer $Q_1^{-1}$ 460' and dequantized D coefficients, $\Delta \hat{D}_n$ are output to a linear estimator 610'. The linear estimator 610' is applied to $\Delta \hat{D}_n$ to produce an estimated DCT coefficient $\hat{C}_n$ which is output to an adder 630'. Similarly, $\tilde{C}_n$ is input to a second inverse quantizer $Q_1^{-1}$ 620' and dequantized C coefficients, $\Delta \hat{C}_n$ are also output to the adder 630'. Then, $\hat{C}_n$ is subtracted from $\Delta \hat{C}_n$ in the adder 630' and the error $D_n^-$ is output. The error $D_n^-$ is input with an input from the rate and redundancy allocation unit 420 to quantizer Q2 640' and quantized to produce $\hat{D}_n^-$. The $\tilde{D}_n$ coefficients and the quantized error $\hat{D}_n^-$ are then together subjected to run-length coding in run length coding unit 650' to produce the resulting bitstream $\tilde{F}_2, \tilde{G}_2$, which constitutes $\tilde{F}_2$ and $\tilde{G}_2$ from FIG. 3A.

In accordance with the current embodiment of the present invention, the DEC2 decoder 380 decoder from FIG. 3B is implemented as an inverse circuit of the ENC2 encoder 310 described in FIG. 4. With the exception of the rate and redundancy unit 420, all of the other components described have analogous inverse components implemented in the decoder. For example, the DEC2 decoder 380 operation is the same as in the DEC1 decoder 370 embodiment, the recovered prediction error is actually a quantized version of F, so that $X_1 = P_1 + \hat{F}$. Therefore, in this implementation, the mismatch between $P_0$ and $P_1$ are left as is, and allowed to accumulate over time in successive P-frames. However, the effect of this mismatch is eliminated upon each new I-frame.

In all of the above embodiments, the quantization parameter in Q1 controls the rate, the transform parameter $\beta_n$ controls the first part of redundancy $\rho_{e,1}$, and the quantization parameter in Q2 controls the second part of redundancy $\rho_{e,2}$. In each embodiment, these parameters are controlled by the rate and redundancy allocation component 420. This allocation is performed based on a theoretical analysis of the tradeoff between rate, redundancy, and distortion, associated with each implementation. In addition to redundancy allocation between $\rho_{e,1}$ and $\rho_{e,2}$ for a given P-frame, the total redundancy, $\rho$, among successive frames must be allocated. This is accomplished by treating coefficients from different frames as different coefficient pairs.

Multiple Description Motion Estimation and Coding (MD-MEC)

Figure 7:
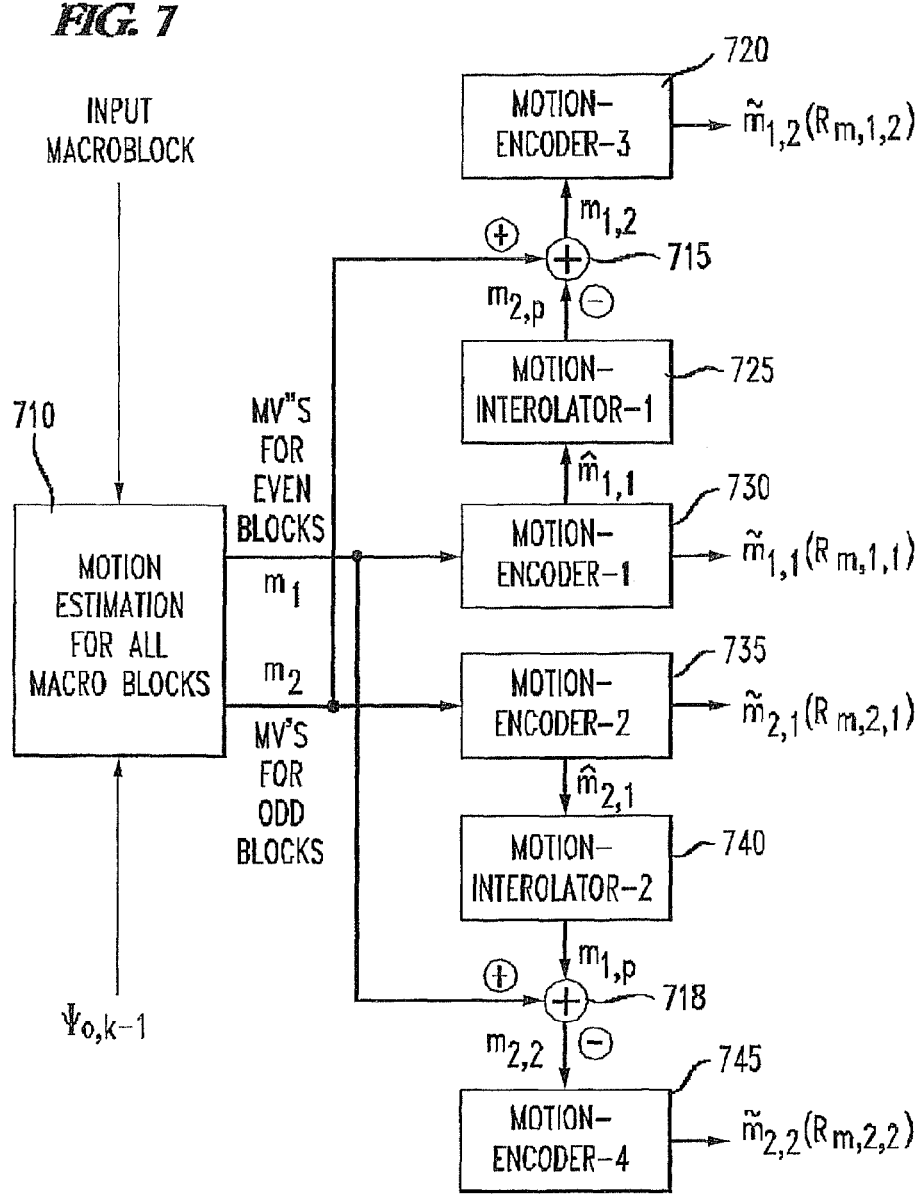
FIG. 7 provides a block diagram of an embodiment of multiple description motion estimation and coding ("MD-MEC") using spatial interleaving of the present invention.

In accordance with an embodiment of the present invention, illustrated in FIG. 7, in a motion estimation component 710, conventional motion estimation is performed to find the best motion vector for each input macroblock X 100. In an alternate embodiment (not shown) a simplified method for performing motion estimation is used in which the motion vectors from the input macroblock X 100 are duplicated on both channels. FIG. 8 shows an arrangement of odd and even macroblocks within each digitized frame in accordance with an embodiment of the present invention. Returning to FIG. 7, the motion estimation component 710 is connected to a video input unit (not shown) for receiving the input macroblocks and to FB0 270 (not shown) for receiving reconstructed macroblocks from previously reconstructed frames from both descriptions, $\psi_{o,k-1}$. The motion estimation component 710 is also connected to a motion-encoder-1 730, an adder 715 and an adder 718. Motion-encoder-1 730 is connected to a motion-interpolator-1 725 and the motion-interpolator-1 725 is connected to the adder 715. The adder 715 is connected to a motion-encoder-3 720. Similarly, motion-encoder-2 735 is connected to a motion-interpolator-2 740 and the motion-interpolator-2 740 is connected to the adder 718. The adder 718 is connected to a motion-encoder-4 745.

In FIG. 7, the motion vectors for the even macroblocks output from the motion estimation unit 710, denoted by $m_1$, are input to Motion-Encoder-1 730, and coded to yield $\tilde{m}_{1,1}$ and reconstructed motions $\hat{m}_{1,1}$. The reconstructed motions, $\hat{m}_{1,1}$, are input to motion interpolator-1 725 which interpolates motions in odd macroblocks from the coded ones in even macroblocks, and outputs $m_{2,p}$ to adder 715. In adder 715 $m_{2,p}$ is subtracted from $m_2$ and $m_{1,2}$ is output, where $m_2$ was received from motion estimation unit 710. $m_{1,2}$ is then input to motion encoder-3 720 and $\tilde{m}_{1,2}$ is output. Similarly, motion vectors for the odd macroblocks, $m_2$, are input to and coded by Motion-Encoder-2 735, and the coded bits and reconstructed motions denoted by $\tilde{m}_{2,1}$ and $\hat{m}_{2,1}$, respectively, are output. The reconstructed motions, $\hat{m}_{2,1}$, are input to motion interpolator-2 740 which interpolates motions in even macroblocks from the coded ones in odd macroblocks, and outputs $m_{1,p}$ to adder 718. In adder 718 $m_{1,p}$ is subtracted from $m_1$ and $m_{2,2}$ is output, where $m_1$ was received from motion estimation unit 710. $m_{2,2}$ is then input to motion encoder-4 745 and $\tilde{m}_{2,2}$ is output.

For a lossless description of motion, all of the four encoders involved should be lossless. An encoder is "lossless" when the decoder can create an exact reconstruction of the encoded signal, and an encoder is "lossy" when the decoder can not create an exact reconstruction of the encoded signal. In accordance with an embodiment of the present invention, lossless coding is used for $m_1$ and $m_2$ and lossy coding is used for $m_{1,2}$ and $m_{2,2}$.

The bits used for coding $m_{1,2}$ and $m_{2,2}$ are ignored when both descriptions are received and, therefore, are purely redundancy bits. This part of the redundancy for motion coding is denoted by $\rho_{m,2}$. The extra bits in independent coding of $m_1$ and $m_2$, compared to joint coding, contribute to the other portion of the redundancy. This is denoted by $\rho_{m,1}$.

In another embodiment of the present invention, conventional motion estimation is first performed to find the best motion vector for each macroblock. Then, the horizontal and vertical components of each motion vector are treated as two independent variables a (pre-whitening transform can be applied to reduce the correlation between the two components) and generalized MDTC method is applied to each motion vector. Let $m_h$, $m_v$ represent the horizontal and vertical component of a motion vector. Using a pairing transform, T, the transformed coefficients are obtained from Equation (1):

$$\begin{bmatrix} m_c \\ m_d \end{bmatrix} = T \begin{bmatrix} m_h \\ m_v \end{bmatrix} \quad (1)$$

Where $\tilde{m}_{i,1}$=1, 2, represents the bits used to code $m_c$ and $m_d$, respectively, and $m_{i,2}$, i=1, 2 represents the bits used to code $m_c^-$ and $m_d^-$, the estimation error for $m_d$ from $m_c$ and the estimation error for $m_c$ from $m_d$, respectively. The transform parameters in T are controlled based on the desired redundancy.

In another embodiment of the present invention (not shown), each horizontal or vertical motion component is quantized using MDSQ to produce two bit streams for all the motion vectors.

Application of MDTC to Block DCT Coding

The MDTC approach was originally developed and analyzed for an ordered set of N Gaussian variables with zero means and decreasing variances. When applying this approach to DCT coefficients of a macroblock (either an original or a prediction error macroblock), which are not statistically stationary and are inherently two-dimensional, there are many possibilities in terms of how to select and order coefficients to pair. In the conventional run length coding approach for macroblock DCT coefficients, used in all of the current video coding standards, each element of the two-dimensional DCT coefficient array is first quantized using a predefined quantization matrix and a scaling parameter. The quantized coefficient indices are then converted into a one-dimensional array, using a predefined ordering, for example, the zigzag order. For image macroblocks, consecutive high frequency DCT coefficients tend to be zero and, as a result, the run length coding method, which counts how many zeros occur before a non-zero coefficient, has been devised. A pair of symbols, which consist of a run length value and the non-zero value, are then entropy coded.

In an embodiment of the present invention, to overcome the non-stationarity of the DCT coefficients as described above, each image is divided into macroblocks in a few classes so that the DCT coefficients in each class are approximately stationary. For each class, the variances of the DCT coefficients are collected, and based on the variances, the number of coefficients to pair, N, the pairing mechanism and the redundancy allocation are determined. These are determined based on a theoretical analysis of the redundancy-rate-distortion performance of MDTC. Specifically, the k-th largest coefficient in variance is always paired with the (N–k)-th largest, with a fixed transform parameter prescribed by the optimal redundancy allocation. The operation for macroblocks in each class is the same as that described above for the implementation of EMDC. For a given macroblock, it is first transformed into DCT coefficients, quantized, and classified into one of the predefined classes. Then depending on the determined class, the first N DCT coefficients are paired and transformed using PCT, while the rest are split even/odd, and appended to the PCT coefficients. The coefficients in each description (C coefficients and remaining even coefficients, or D coefficients and remaining odd coefficients) usually have many zeros. Therefore, the run length coding scheme is separately applied to the two coefficient streams.

In an alternative embodiment of the present invention (not shown), instead of using a fixed pairing scheme for each macroblock in the same class, which could be pairing zero coefficients, a second option is to first determine any non-zero coefficients (after quantization), and then apply MDTC only to the non-zero coefficients. In this embodiment, both the location and the value of the non-zero coefficients need to be specified in both descriptions. One implementation strategy is to duplicate the information characterizing the locations of the two coefficients in both descriptions, but split the two coefficient values using MDTC. A suitable pairing scheme is needed for the non-zero coefficients. An alternative implementation strategy is to duplicate some of the non-zero coefficients, while splitting the remaining one in an even/odd manner.

Figure 9:
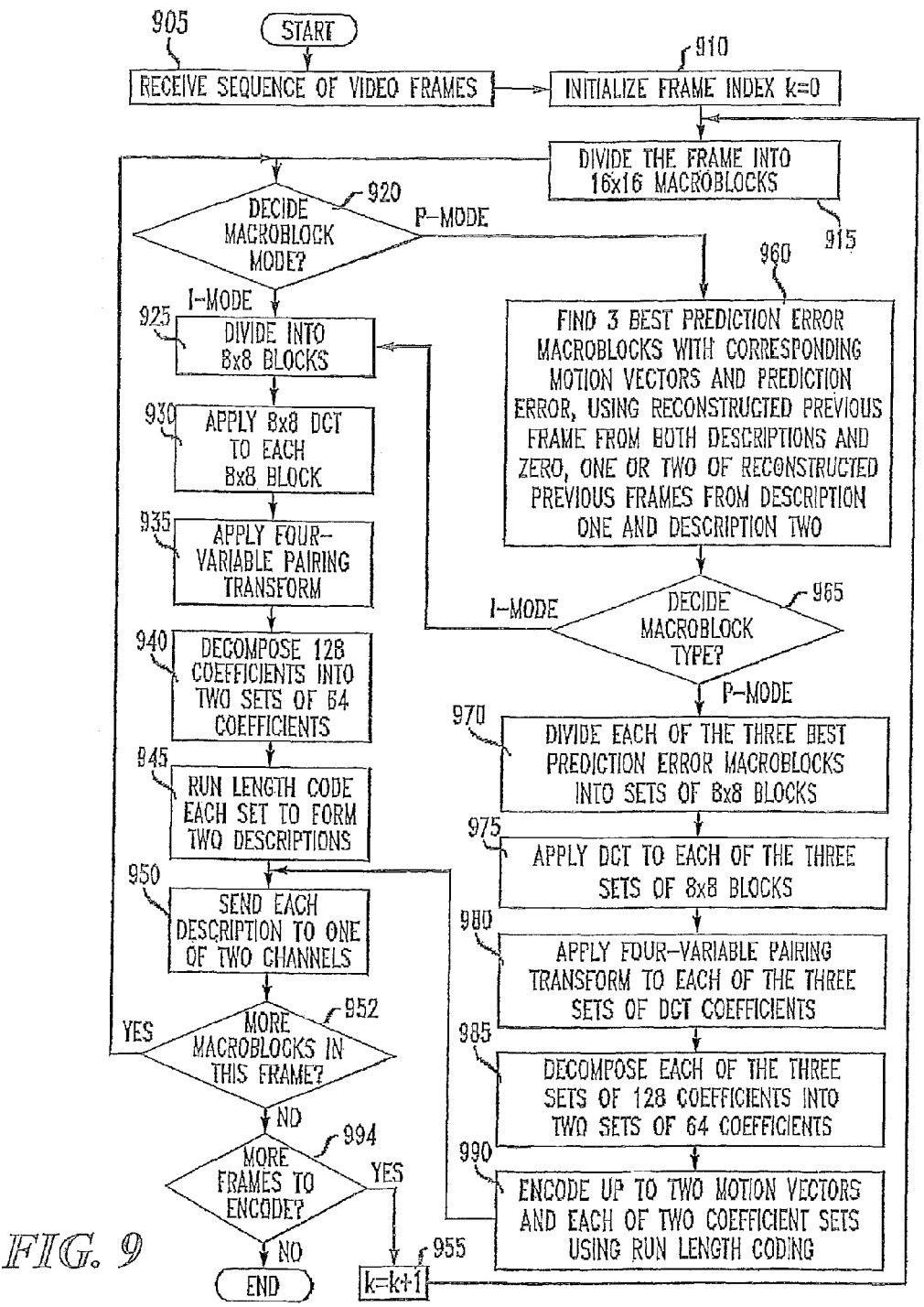
FIG. 9 is a flow diagram representation of an embodiment of the encoder operations of the present invention.

FIG. 9 is a flow diagram representation of an embodiment of an encoder operation in accordance with the present invention. In FIG. 9, in block 905 a sequence of video frames is received and in block 910 the frame index value k is initialized to zero. In block 915 the next frame in the sequence of video frames is divided into a macroblock representation of the video frame. In an embodiment of the present invention, the macroblock is a 16×16 macroblock. Then, in block 920, for a first macroblock a decision is made on which mode will be used to code the macroblock. If the I-mode is selected in block 920, then, in block 925 the 16×16 macroblock representation is divided into 8×8 blocks and in block 930 DCT is applied to each of the 8×8 blocks and the resulting DCT coefficients are passed to block 935. In an embodiment of the present invention, four 8×8 blocks are created to represent the luminance characteristics and two 8×8 blocks are created to represent the chromanance characteristics of the macroblock. In block 935, a four-variable transform is applied to the DCT coefficients to produce 128 coefficients, which, in block 940, are decomposed into two sets of 64 coefficients. The two sets of 64 coefficients are each run length coded to form two separate descriptions in block 945. Then, in block 950, each description is output to one of two channels. In block 952, a check is made to determine if there are any more macroblocks in the current video frame to be coded. If there are more macroblocks to be coded, then, the encoder returns to block 920 and continues with the next macroblock. If there are not any more macro blocks to be coded in block 952, then, in block 954 a check is made to determine if there are any more frames to be coded, and if there are not any more frames to be coded in block 954, then the encoder operation ends. If, in block 954, it is determined that there are more frames to be coded, then, in block 955 the frame index k is incremented by 1 and operation returns to block 915 to begin coding the next video frame.

If, in block 920, the P-mode is selected, then, in block 960, the three best prediction macroblocks are determined with their corresponding motion vectors and prediction errors using a reconstructed previous frame from both descriptions and zero, one or two of the reconstructed previous frames from description one and description two. Then, in block 965 for the three best macroblocks a decision is made on which mode will be used to code the macroblocks. If the I-mode is selected in block 965, then, the macroblocks are coded using the method described above for blocks 925 through block 955. If the P-mode is selected in block 965, then, in block 970 each of the three prediction error macroblocks is divided into a set of 8×8 blocks. In block 975, DCT is applied to each of the three sets of 8×8 blocks to produce three sets of DCT coefficients for each block and, then, in block 980, a four-variable pairing transform is applied to each of the three sets of DCT coefficients for each block to produce three sets of 128 coefficients. Each of the three sets of 128 coefficients from block 980 are decomposed into two sets of 64 coefficients in block 985 and the results are provided to block 990. In block 990, up to two motion vectors and each of the two sets of 64 coefficient are encoded using run-length coding to form two descriptions. Then, in block 950, each description is output to one of two channels. In block 952, a check is made to determine if there are any more macroblocks in the current video frame to be coded. If there are more macroblocks to be coded, then, the encoder returns to block 920 and continues with the next macroblock. If there are not any more macro blocks to be coded in block 952, then, in block 954 a check is made to determine if there are any more frames to be coded, and if there are not any more frames to be coded in block 954, then the encoder operation ends. If, in block 954, it is determined that there are more frames to be coded, then, in block 955 the frame index k is incremented by 1 and operation returns to block 915 to begin coding the next video frame.

Figure 10:
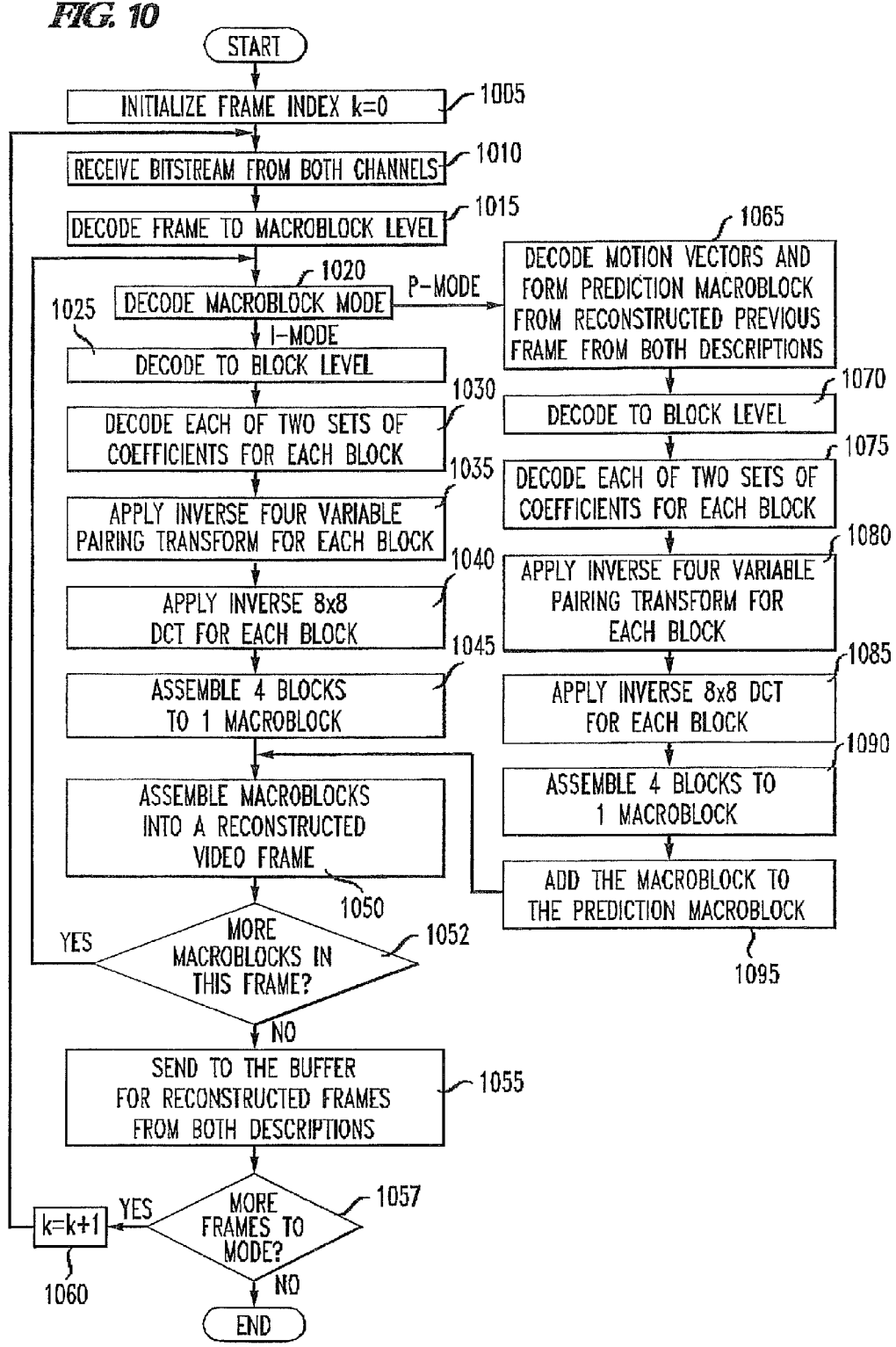
FIG. 10 is a flow diagram representation of an embodiment of the decoder operations of the present invention when the decoder receives two coded descriptions of a video frame.

FIG. 10 is a flow diagram representation of the operations performed by a decoder when the decoder is receiving both descriptions, in accordance with an embodiment of the present invention. In FIG. 10, in block 1005 the frame index k is initialized to zero. Then, in block 1010, the decoder receives bitstreams from both channels and in block 1015 the bitstreams are decoded to the macroblock level for each frame in the bitstreams. In block 1020, the mode to be used for a decoded macroblock is determined. If, in block 1020, the mode to be used for the macroblock is determined to be the I-mode, then, in block 1025 the macroblock is decoded to the block level. In block 1030, each block from the macroblock is decoded into two sets of 64 coefficients, and in block 1035 an inverse four-variable pairing transform is applied to each of the two sets of 64 coefficients to produce the DCT coefficients for each block. In block 1040, an inverse 8×8 DCT is applied to the DCT coefficients for each block to produce four 8×8 blocks. Then, in block 1045, the four 8×8 blocks are assembled into one 16×16 macroblock.

If, in block 1020, the mode to be used for the macroblock is determined to be the P-mode, then, in block 1065, the motion vectors are decoded and a prediction macroblock is formed from a reconstructed previous frame from both descriptions. In block 1070 the prediction macroblock from block 1065 is decoded to the block level. Then, in block 1075, each block from the prediction macroblock is decoded into two sets of 64 coefficients, and in block 1080 an inverse four-variable pairing transform is applied to each of the two sets of coefficients to produce the DCT coefficients for each block. In block 1085, an inverse 8×8 DCT is applied to the DCT coefficients for each block to produce four 8×8 blocks. Then, in block 1090, the four 8×8 blocks are assembled into one 16×16 macroblock, and in block 1095 the 16×16 macroblock from block 1090 is added to the prediction macroblock which was formed in block 1065.

Regardless of whether I-mode or P-mode decoding is used, after either block 1045 or block 1095, in block 1050 the macroblocks from block 1045 and block 1095 are assembled into a frame. Then, in block 1052, a check is made to determine if there are any more macroblocks in the current video frame to be decoded. If there are more macroblocks to be decoded, then, the decoder returns to block 1020 and continues with the next macroblock. If there are not any more macro blocks to be decoded in block 1052, then, in block 1055, the frame is sent to the buffer for reconstructed frames from both descriptions. In block 1057 a check is made to determine if there are any more frames to decode, and if there are not any more frames to decode in block 1057, then the decoder operation ends. If, in block 1057, it is determined that there are more frames to decode, then, in block 1060 the frame index, k, is incremented by one and the operation returns to block 1010 to continue decoding the bitstreams as described above.

Figure 11:
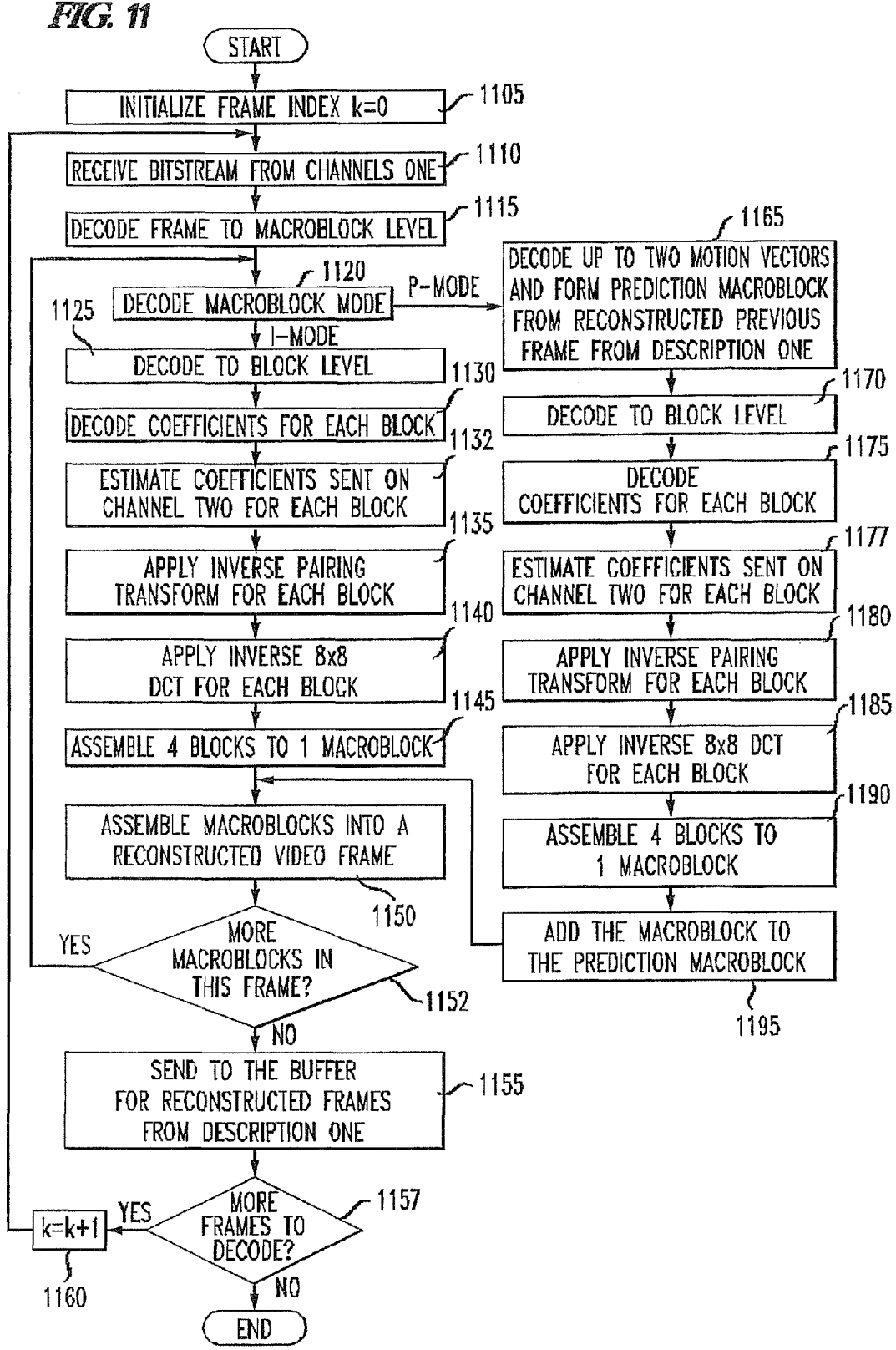
FIG. 11 is a flow diagram representation of another embodiment of the decoder operations of the present invention when the decoder only receives one coded description of a video frame.

FIG. 11 is a flow diagram representation of the operations performed by a decoder when the decoder is receiving only description one, in accordance with an embodiment of the present invention. In FIG. 11, in block 1105 the frame index k is initialized to zero. Then, in block 1110, the decoder receives a single bitstream from channel one and in block 1115 the bitstream is decoded to the macroblock level for each frame in the video bitstream. In block 1120, the mode used for a decoded macroblock is determined. If, in block 1120, the mode of the macroblock is determined to be the I-mode, then, in block 1125 the macroblock is decoded to the block level. In block 1130, each block from the macroblock is decoded into two sets of 64 coefficients, and in block 1132 an estimate for the two sets of 64 coefficients for the description on channel two, which was not received, is produced for each block. In block 1135 an inverse four-variable pairing transform is applied to each of the two sets of 64 coefficients to produce the DCT coefficients for each block. In block 1140, an inverse 8×8 DCT is applied to the DCT coefficients for each block to produce four 8×8 blocks. Then, in block 1145, the four 8×8 blocks are assembled into a 16×16 macroblock.

If, in block 1120, the mode of the macroblock is determined to be the P-mode, then, in block 1165, up to two motion vectors are decoded and a prediction macroblock is formed from a reconstructed previous frame from description one. In block 1170 the prediction macroblock from block 1165 is decoded to the block level. Then, in block 1175, each block from the prediction macroblock is decoded into two sets of 64 coefficients, and in block 1177 an estimate for the two sets of 64 coefficients for the description on channel two, which was not received, is produced for each block. In block 1180 an inverse four-variable pairing transform is applied to each of the two sets of 64 coefficients to produce the DCT coefficients for each block. In block 1185, an inverse 8×8 DCT is applied to the DCT coefficients for each block to produce four 8×8 blocks. Then, in block 1190, the four 8×8 blocks are assembled into a 16×16 macroblock, and in block 1195 the macroblock from block 1190 is added to the prediction macroblock formed in block 1165.

Regardless of whether I-mode or P-mode decoding is used, after either block 1145 or block 1195, in block 1150 the macroblocks from block 1145 and block 1195 are assembled into a frame. In block 1152, a check is made to determine if there are any more macroblocks in the current video frame to be decoded. If there are more macroblocks to be decoded, then, the decoder returns to block 1120 and continues with the next macroblock. If there are not any more macro blocks to be decoded in block 1152, then, in block 1155, the frame is sent to the buffer for reconstructed frames from description one. In block 1157 a check is made to determine if there are any more frames to decode, and if there are not any more frames to decode in block 1157, then the decoder operation ends. If, in block 1157, it is determined that there are more frames to decode, then, in block 1160 the frame index, k, is incremented by one and the operation returns to block 1110 to continue decoding the bitstream as described above.

While the decoder method of operations shown in FIG. 11, and described above, are directed to an embodiment in which the decoder is only receiving description one, the method is equally applicable when only description two is being received. The modifications that are required merely involve changing block 1110 to receive the bitstream from channel two; changing block 1165 to form the prediction macroblock from reconstructed previous frame from description two; and changing blocks 1132 and 1177 to estimate the coefficients sent on channel one.

In the foregoing detailed description and figures, several embodiments of the present invention are specifically illustrated and described. Accordingly, it will be appreciated that modifications and variations of the present invention are covered by the above teachings and within the purview of the appended claims without departing from the spirit and intended scope of the invention.

What is claimed is:

1. An encoder comprising:
a first module responsive to a video frame, the first module configured to divide the video frame into macroblocks;
a mode selection element configured to select each of the macroblocks for intra-frame coding mode (I-mode) encoding or for predictive coding mode (P-mode) encoding;
an I-mode module configured to encode a first macroblock that is selected for I-mode encoding by coding color values of the first macroblock into an I-mode first description of a multiple description coding scheme and into an I-mode second description of the multiple description coding scheme; and
a P-mode module configured to encode a second macroblock that is selected for P-mode encoding by coding both a motion vector and an error into a first P-mode description and into a second P-mode description by predicting the second macroblock based on a previously encoded frame.

2. The encoder of claim 1, wherein the error corresponds to a difference between the second macroblock and another macroblock from a previous frame that is used to predict the second macroblock.

3. The encoder of claim 2, wherein the motion vector is descriptive of displacement between the second macroblock and a best matching macroblock.

4. The encoder of claim 3, wherein both the error and the motion vector are coded into multiple descriptions.

5. The encoder of claim 1, wherein the mode selection element applies one macroblock to the I-mode module for every x macroblocks that are routed to the P-mode module, where x is a number between 10 and 15.

6. The encoder of claim 1, further comprising a rate control unit, wherein the rate control unit is configured to influence whether the mode selection element applies each of the macroblocks to the I-mode module or to the P-mode module.

7. A method for encoding video frames comprising:
dividing a video frame into macroblocks;
selecting each of the macroblocks for I-mode encoding or for P-mode encoding;
encoding a first macroblock that is selected for I-mode encoding by coding color values of the first macroblock into an I-mode first description of a multiple description coding scheme and an I-mode second description of the multiple description coding scheme; and
encoding a second macroblock that is selected for P-mode encoding by coding both a motion vector and an error into a P-mode first description and into a P-mode second description.

8. The method of claim 7, wherein the motion vector represents a displacement between the second macroblock and a best matching macroblock.

9. The method of claim 7, wherein a first set of descriptions comprises the I-mode first description and the I-mode second description, and wherein, when one description of the first set of descriptions is not received, the video frame can be reconstructed by using another description of the first set of descriptions.

10. The method of claim 9, wherein a second set of descriptions comprises the P-mode first description and the P-mode second description, and wherein, when one description of the second set of description is not received, the video frame can be reconstructed by using another description of the second set of descriptions.

11. The method of claim 7, wherein the error corresponds to a difference between the second macroblock and a previously encoded frame.

12. The method of claim 7, wherein both the error and the motion vector are coded into multiple descriptions.

13. The method of claim 7, wherein the I-mode encoding is applied to one macroblock for every x macroblocks, where x is a number between 10 and 15.

14. The method of claim 7, wherein a determination as to whether to apply the I-mode encoding or the P-mode encoding to a particular macroblock is responsive to a rate control unit.

15. The method of claim 7, wherein a determination as to whether to apply the I-mode encoding or the P-mode encoding to a particular macroblock is responsive to a redundancy allocation unit.

\* \* \* \* \*